Figure 1:
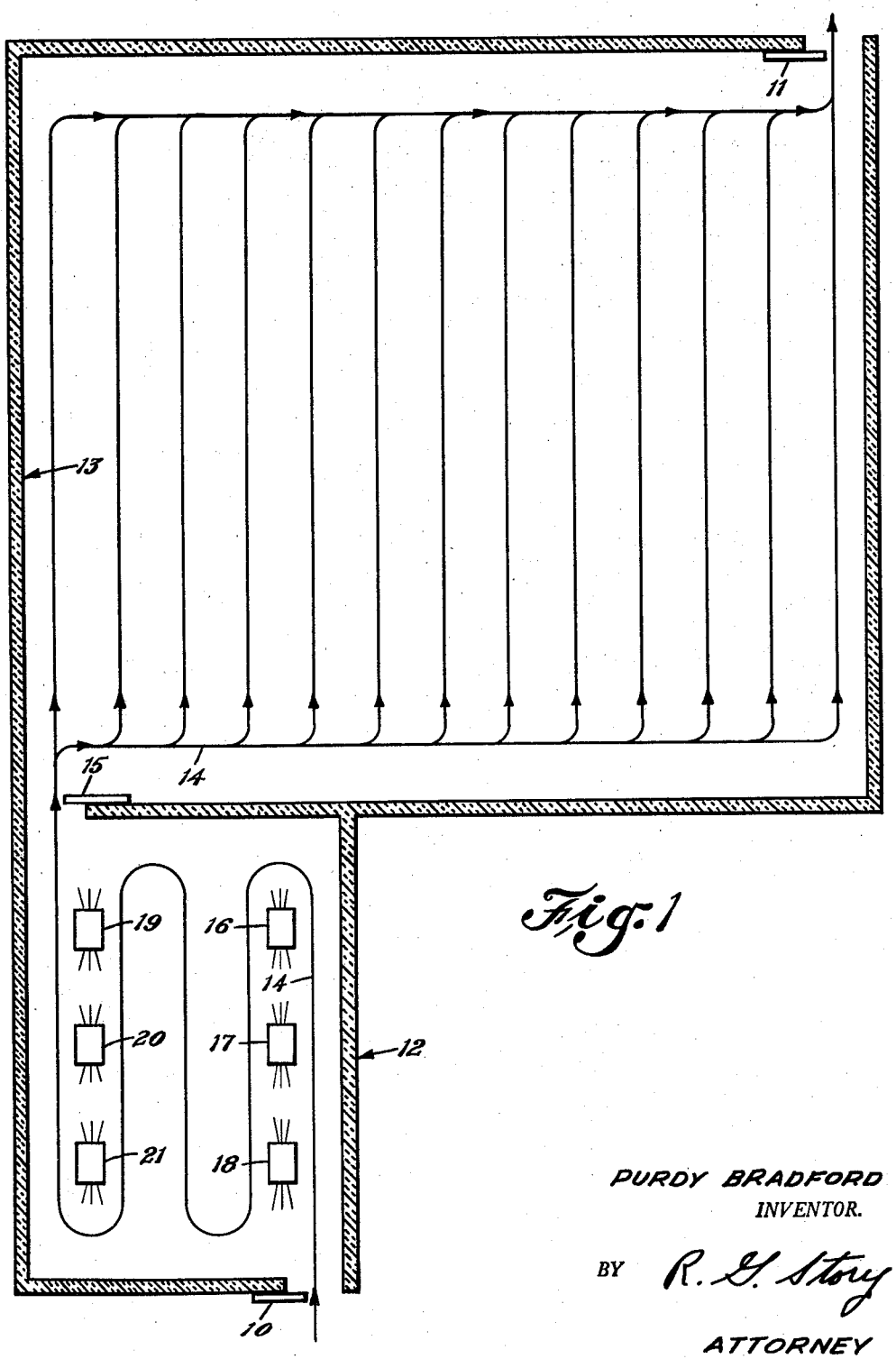
Figure 2:
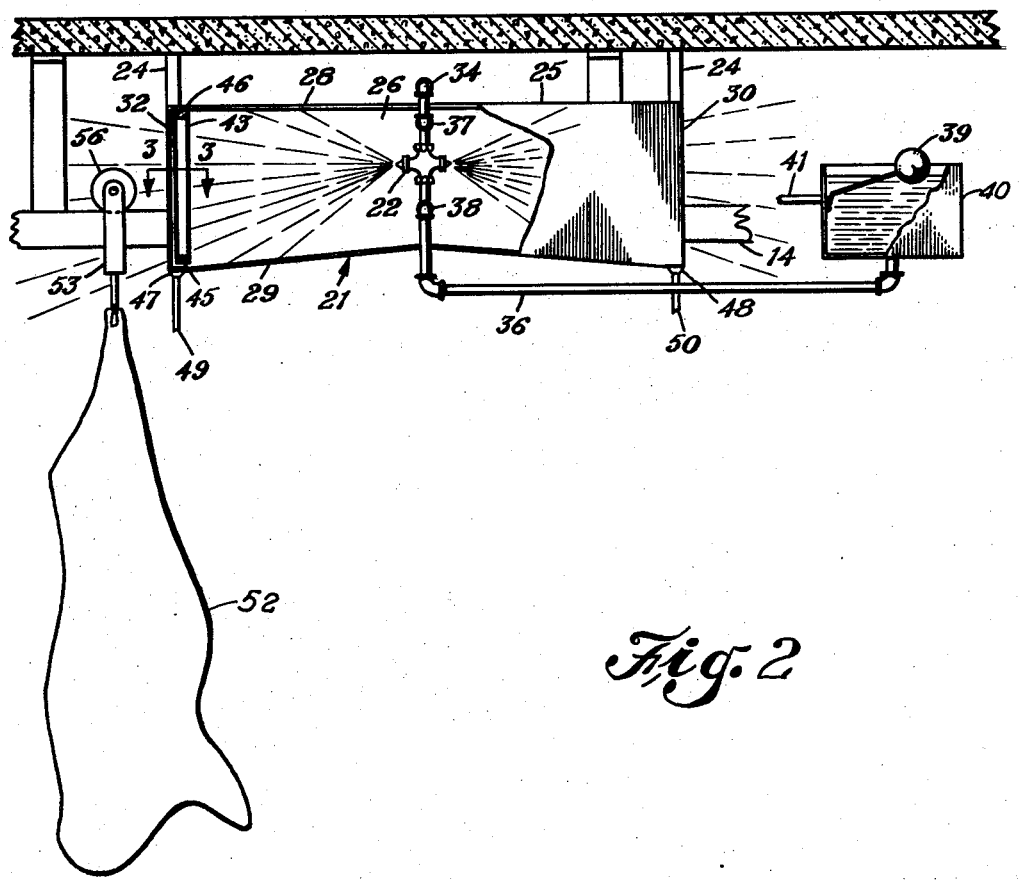
Figure 3:
Figure 3:
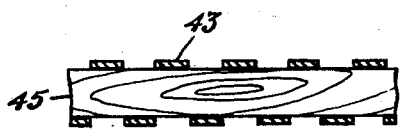

Nov. 11, 1958 P. BRADFORD 2,860,056
METHOD OF CHILLING CARCASS MEAT
Filed April 8, 1955 2 Sheets-Sheet 1

PURDY BRADFORD
INVENTOR.

BY R. G. Story

ATTORNEY

Nov. 11, 1958   P. BRADFORD   2,860,056
METHOD OF CHILLING CARCASS MEAT

Filed April 8, 1955   2 Sheets-Sheet 2

PURDY BRADFORD
INVENTOR.

BY *R. G. Story*

ATTORNEY

United States Patent Office 2,860,056
Patented Nov. 11, 1958

2,860,056

METHOD OF CHILLING CARCASS MEAT

Purdy Bradford, Palos Park, Ill., assignor to Swift & Company, Chicago, Ill., a corporation of Illinois Application April 8, 1955, Serial No. 500,089

4 Claims. (Cl. 99—194)

This invention is concerned with a method of conducting the chilling operation of a packing house to substantially reduce the shrinkage loss attributable to moisture evaporation from freshly dressed carcasses.

In conventional packing house operation the carcasses are removed from the killing floor to a chilling cooler where they are held for 24 hours or so to remove the animal heat. During chilling there is considerable loss of moisture or shrinkage; for example, in the chilling of lamb the shrinkage will normally run between 1.7–2.25 percent, with the shrinkage for pork and beef being somewhat less. Frequently during the chilling operation meat will lose its natural bloom. It will be appreciated that to the packer shrinkage is a monetary loss and that it is desirable to protect the red color of the meat during the chilling operation.

It is an object of my invention to provide a method whereby the carcass meat may be chilled without loss of bloom and to reduce the loss in weight attributable to moisture evaporation.

I have found a method of conducting the chilling operation which will permit a substantial reduction of the shrinkage loss and which is readily adapted to use with present facilities without excessive expense. I have learned that by far the greatest amount of shrinkage occurs during the initial hours of the chilling operation. The fact that the shrinkage comes about principally during the first hours permits ready adaption of present facilities to my method.

It has been known for some time by workers in the packing house industry that shrinkage could be lessened through use of high humidity in the chilling room. Considerable work has been done in the past, with the addition of steam to the cooler, to lessen shrinkage. While the use of steam does reduce shrinkage to some extent, it is questionable whether there has been any economic gain because of the added refrigeration expense. In the practice of my process I hold the meat during the initial hours of chilling in an atmosphere having a moisture content considerably in excess of the dew point of the air. Presumably, shrinkage could be reduced by maintaining the moisture load of the chilling room at all times in excess of saturation, but this is uneconomical and otherwise objectionable, and I propose to hold the freshly slaughtered meat only for the initial hours of chilling in the saturated atmosphere. It is not feasible to provide means for intermittent operation of the chilling room with a supersaturated atmosphere for the reason that meat is moved continuously from the killing floor into the chiller, and therefore, in order to subject all of the carcasses to supersaturated conditions during their early hours of chilling, the air of the chiller would have to be continuously supersaturated during the hours of operation of the killing floor.

In my process the freshly dressed carcasses are moved from the killing floor to a first zone where they are held in a fine fog from which the relatively larger moisture drops have been removed until the surface temperature of the meat approaches the dew point of the atmosphere. Following this the carcasses are then removed to a second zone maintained at normal chilling room conditions, without excess moisture, to complete the chilling of the meat. For optimum operation I prefer to hold the first zone at 30°–32° F. ambient temperature and at a moisture content equivalent to a 45°–50° F. dew point (that is, the moisture content of the air would be that of saturated air within the temperature range of 45°–50° F.). The first zone may be held at a temperature outside the preceding preferred range for optimum operation and within the range of normal refrigeration temperatures for meat which is generally 30–35° F. Air having a dew point within the range of 45°–50° F. carries 44–53 grains total moisture per pound of dry air. The carcasses are held in this first zone until the surface temperature of the meat approaches the dew point temperature, at which time they are transferred to the second zone, which may be a conventional chiller, to complete the cooling of the meat. Practice of my process will generally cut shrinkage losses in half.

From my experience I have concluded that meat which has the same surface temperature as the surrounding air will be in equilibrium with the air if the air be at approximately 95 percent relative humidity; that is to say, there is little or no exchange of moisture at this relative humidity. Since the meat from the killing floor will have a temperature in the neighborhood of 100° F., it will be seen that with the chiller being held at 32° F., the meat will necessarily give up moisture to the surrounding air. At 32° F. saturated air will contain only 0.0036 lbs. of moisture per pound of air. If the meat, after one hour chilling, has a surface temperature of 71° F., it is necessary, in order to prevent surface evaporation, that the air of the chilling room should have the moisture content of air of 71° F. and 95 percent relative humidity. Air at 71° F. having a relative humidity of 95 percent carries 0.0152 lb. of water per pound of air. Thus, in order to prevent surface evaporation, it is necessary to add 0.0116 lb. of water per pound of air at this temperature. The mere provision of the necessary amount of water in the air does not of itself prevent dehydration of the meat unless the excess moisture is provided in the form of a fog or mist with small drops. A fog made up principally of relatively large drops of moisture is unsuitable, as the liquid phase must be present in fine enough drops to evaporate very rapidly when the air is raised in temperature upon approaching the surface of the carcass being chilled. It has been calculated that a 10 micron drop will evaporate in approximately one second when the air in which it is suspended increases from 32° F. to 60° F. The time of evaporation increases as the square of the drop diameter, so that a 50 micron drop would require 25 seconds for evaporation. A fog containing large drops has the further objection that it will settle on the walls, floor, and other surfaces. It has been my experience that a coarse fog will settle upon the carcasses being chilled and produce a slimy condition in time. On the other hand, a fog from which the large drops have been removed does not have this objection and will actually improve the appearance of the product by retaining the natural bloom.

Figure 1 is a schematic layout of a plant having a first and second chilling room adapted to the practice of the method of my invention;

Figure 2 is a partial elevational view, partly in cross section, of the first chilling room illustrating, among other things, a nozzle arrangement for forming the fine mist necessary to the practice of my process; and Figure 3 is a partial cross sectional view of the baffle arrangement of the nozzle box taken along line 3—3 of Figure 2.

With reference to the diagram of Figure 1 it will be seen that the freshly dressed carcasses are moved through a sliding door 10 into a first chamber 12 on an overhead continuous rail 14 which laps the length of the chamber five times and passes through a second sliding door 15 into a conventional chilling cooler 13. In the second chiller the overhead rail branches into 13 paths each of which extends nearly the length of the chamber. The several paths join at the far end of the chamber to reform the single rail which leaves the second chiller through a third sliding door 11.

Both chilling coolers are held at a temperature within a range of 30°–32° F. In the first chamber the moisture contents of the air is maintained at an elevated dew point and preferably at a dew point with the range of 45°–50° F.; that is, the moisture content of the air would be that of saturated air within the temperature range of 45°–50° F. The carcasses are held in this first chamber at least until the surface temperature of the meat is nearly equal the dew point temperature, at which time they are then moved into the conventional chilling cooler to complete the chill.

The size of the first chamber will vary depending upon the magnitude of the operation. The basic design is such that it will permit the freshly dressed carcasses to remain in the first chamber for roughly 4 to 7 hours before transfer to the larger chilling cooler. A holding period of four to five hours is sufficient for lambs in the first chamber, with periods of five to seven hours and five to six hours, respectively, being adequate for beef and pork. Several nozzle boxes 16, 17, 18, 19, 20, and 21 suspended from the ceiling of the first cooler provide the necessary moisture to give the supersaturated condition.

With reference to Figure 2, a double pneumatic spray nozzle 22, one in a series of a bank of 4, is enclosed in the nozzle box 21 which is hung from the ceiling by hangers 24. Varying types of nozzles which will emit a fine spray may be employed. Ends 25, 26, the top 28, and the bottom 29 of the box are enclosed with sheet metal. The sides 30 and 32 toward which the several nozzles spray are screens designed to remove the larger drops from the spray to give a fine fog. The nozzle illustrated provides a spray from its opposite ends. Compressed air at 70 p. s. i. is provided through an air line 34 which enters the nozzle box through its end 25 and connects to a manifold 37 for distribution to the bank of 4 double nozzles. A second conduit 36 which provides water for the nozzles feeds into a second manifold 38 which connects individually to each of the atomizing nozzles at their bottom sides. Conduit 36 extends downward from the manifold 38 to a point below the nozzle box and from there it extends to the bottom of a water tank 40. The water tank is provided with a float valve 39 which maintains a constant water level to give a four-inch siphon on the water supplied to the pneumatic nozzles. A pipe 41 supplies the water for the tank.

The spray screens which make up the two sides 30, 32 of the nozzle box are shown in cross section in Figure 3. Each spray screen is made up of two rows of ⅜-inch straps 43 placed on opposite sides of two superposed horizontal members 45, 46, to form a frame with the individual straps of each row being spaced ⅜ inch apart. The two members 45, 46 are ½ inch wide. The two opposing rows of grids are staggered so as to assure impingement of the larger drops upon a flat surface of one of the straps in passing of the spray through the screen. The large drops which impinge upon the straps drain into the troughs 47, 48 at the outer bottom of the nozzle box and from there are carried away by drains 49, 50 to the sewer. The nozzles are spaced 24 inches from the screens. In Figure 2, a carcass 52, carried by a hanger 53 of a trolley 56, is shown suspended from the continuous rail 14 adjacent the nozzle box.

According to my experience, 14 lbs. of water per hour should be provided through the spray screen of the nozzle box per 1000 cubic feet of air circulated within the first chamber. The screen of the type illustrated will pass 65 percent of the water sprayed. Pneumatic atomizing nozzles operated at 70 p. s. i. air pressure, delivering 2 lbs. of water per hour and operating with a four-inch siphon height, have been successfully utilized.

Obviously, many modifications and variations of the invention as hereinbefore set forth may be made without departing from the spirit and scope thereof, and therefore only such limitations should be imposed as are indicated in the appended claims.

I claim:

1. A method of chilling carcass meat to substantially reduce the shrinkage loss attributable to the moisture evaporation from freshly killed carcasses to maintain the bloom of the meat, which comprises forming a spray of water, impinging the spray upon a surface to remove the larger water drops therefrom to produce a fog having discrete water particles, circulating the fog in a first zone held at a refrigeration temperature within the range of about 30–35° F. to create an atmosphere having an elevated dew point within the range of 45°–50° F., holding a carcass in said zone until its surface temperature approaches the dew point of the atmosphere, and then removing the carcass to a second zone maintained at a normal chilling room temperature without excess moisture to complete the chilling of the carcass.

2. A method of conducting the chilling operation in the processing of meat to substantially reduce the shrinkage loss attributable to the moisture evaporation from freshly killed carcasses and to maintain the bloom of the meat, which comprises forming a spray of water, directly impinging the spray upon a flat surface to remove the larger water drops therefrom to produce a fog, circulating the fog in a first zone having an ambient temperature within the range of 30°–35° F. to create an atmosphere having a dew point within the range of 45°–50° F., holding a carcass in said zone for a period within the range of approximately four to seven hours, and then removing the carcass to a larger second zone maintained at a normal chilling room temperature without excess moisture to complete the chilling of the carcass.

3. A method of chilling recently killed carcasses for use with a conventional chilling zone maintained at conventional carcass-chilling conditions, said method comprising cooling the atmosphere of a prechilling zone to a temperature of between 30° F. and 35° F., producing a fog in said atmosphere composed of fine drops of an amount such that the dew point of said atmosphere is between about 45° F. and about 50° F., sequentially moving each carcass into said prechilling zone, holding each carcass in said prechilling zone for a period of between about four to about seven hours, and thereafter moving each carcass into said conventional chilling zone.

4. A method of chilling recently killed carcasses for use with a conventional chilling zone maintained at conventional carcass-chilling conditions, said method comprising cooling the atmosphere of a prechilling zone to a temperature of between 30° F. and 35° F., producing a fog in said atmosphere composed of fine drops to supersaturate said atmosphere to an extent that the dew point of said atmosphere is between about 45° F. and about 50° F., sequentially moving said carcasses into said prechilling zone, holding said carcasses in said prechilling zone for a period of between four to seven hours, and moving each carcass into said conventional chilling zone as the temperature of each carcass becomes nearly equal to the temperature in said prechilling zone.

References Cited in the file of this patent

UNITED STATES PATENTS

| | | |
|---|---|---|
| 1,465,028 | Stacey | Aug. 14, 1923 |
| 2,065,358 | Zarotschenzeff | Dec. 22, 1936 |
| 2,489,918 | Menges | Nov. 29, 1949 |
| 2,705,678 | Morrison | Apr. 5, 1955 |